US012570194B2

(12) United States Patent
Osa et al.

(10) Patent No.: US 12,570,194 B2
(45) Date of Patent: Mar. 10, 2026

(54) SEAT CUSHION FRAME, VEHICLE SEAT FRAME, AND VEHICLE SEAT

(71) Applicants: NHK SPRING CO., LTD., Yokohama (JP); SUBARU CORPORATION, Tokyo (JP)

(72) Inventors: Syunichirou Osa, Yokohama (JP); Hiroki Matsuda, Yokohama (JP); Jun Shirai, Yokohama (JP); Masafumi Takano, Tokyo (JP); Kenji Nagumo, Tokyo (JP); Fumito Kitanaka, Tokyo (JP); Suguru Ishikawa, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 48 days.

(21) Appl. No.: 18/145,771

(22) Filed: Dec. 22, 2022

(65) Prior Publication Data

US 2023/0202363 A1     Jun. 29, 2023

(30) Foreign Application Priority Data

Dec. 27, 2021     (JP) ................................. 2021-213146

(51) Int. Cl.
*B60N 2/68*              (2006.01)
(52) U.S. Cl.
CPC ..................................... *B60N 2/68* (2013.01)
(58) Field of Classification Search
CPC ..... B60N 2/68; B60N 2/42718; B60N 2/4221

USPC ....................................................... 297/216.1
See application file for complete search history.

(56) References Cited

U.S. PATENT DOCUMENTS

| | | | |
|---|---|---|---|
| 8,240,758 B2 * | 8/2012 | Combest | B60N 2/42718 |
| | | | 297/216.19 |
| 9,446,696 B2 * | 9/2016 | Sugiyama | B60N 2/68 |
| 2013/0278030 A1 | 10/2013 | Munemura et al. | |

FOREIGN PATENT DOCUMENTS

| | | |
|---|---|---|
| JP | 2002-046513 A | 2/2002 |
| JP | 2006-151105 A | 6/2006 |
| JP | 4936823 B2 | 5/2012 |
| JP | 2013-220784 A | 10/2013 |
| JP | 2019-127187 A | 8/2019 |

OTHER PUBLICATIONS

Office Action issued in Japanese Application No. 2021-213146, dated Apr. 22, 2025.

* cited by examiner

*Primary Examiner* — Anthony D Barfield
(74) *Attorney, Agent, or Firm* — Knobbe, Martens, Olson & Bear, LLP

(57) ABSTRACT

A seat cushion frame configuring a framework of a seat cushion for an occupant of a vehicle to sit on and including left and right side frames and a cushion pan. The left and right side frames are disposed at left and right side portions of the seat cushion. The cushion pan connects upper end portions of front portions of the left and right side frames together in a seat left-right direction, and is weakened locally at a weakened portion provided at a seat left-right direction center of a rear end portion of the cushion pan.

7 Claims, 10 Drawing Sheets

UP

FR

36

37

76

68

SEAT CUSHION FRAME, VEHICLE SEAT FRAME, AND VEHICLE SEAT

CROSS-REFERENCE TO RELATED APPLICATION

This application is based on and claims priority under 35 USC 119 from Japanese Patent Application No. 2021-213146 filed on Dec. 27, 2021, the disclosure of which is incorporated by reference herein.

BACKGROUND

The present disclosure relates to a vehicle seat and a frame thereof.

Related Art

An automobile seat described in Japanese Patent No. 4936823 includes a seatbelt connected to an emergency lock-type take-up device, and a seat cushion configured by a cushion member mounted to a seat cushion frame. A stopper extending along a width direction is installed to a lower portion of the seat cushion further rearward than a front end thereof, and a panel section is installed to a portion of the seat cushion frame further forward than the stopper. A tiltable portion is provided to a portion of the panel section forward of the stopper, and the tiltable portion is configured to tilt over downward when a pressing force acts from above at a specific value or greater. The tiltable portion is disposed so as to be below an occupant's pelvic region when the seatbelt by has been locked.

In the configuration described above, the pelvic region of the occupant that is attempting to move forward during rapid deceleration of the automobile is stopped appropriately by the stopper, and moreover forward tilting of the chest of the occupant is suppressed by the seatbelt connected to the emergency lock-type take-up device. When forward tilting of the chest of the occupant is suppressed, a submarining phenomenon tends to occur in which the pelvic region of the occupant moves forward while sinking into the seat cushion. However the pelvic region attempting to move forward is stopped appropriately by the stopper, and so sudden forward movement of the pelvic region due to the submarining phenomenon is suppressed. Thereafter when the seatbelt has been locked, the pelvic region that has surpassed the stopper subsides downward about a fulcrum of a fixed portion of the seatbelt while the pelvic region is being stopped elastically by the tiltable portion provided to the panel section forward of the stopper. Shock energy is accordingly effectively absorbed by the tiltable portion, thereby enabling an effective reduction in the risk of damage to the occupant during the sudden acceleration.

SUMMARY

The related art described above has a configuration in which the pelvic region of the occupant that has surpassed the stopper of the seat cushion frame is stopped by the tiltable portion provided to the panel section forward of the stopper, and so this results in a large amount of forward movement of the pelvic region of the occupant. There is accordingly room for improvement from the perspective of suppressing forward movement of the occupant's pelvic region.

In consideration of the above circumstances, an object of the present disclosure is to obtain a seat cushion frame, a vehicle seat frame, and a vehicle seat that are capable of securing shock absorbing ability while also suppressing forward movement of an occupant's pelvic region during a head-on collision.

A seat cushion frame of a first aspect of the present disclosure is a seat cushion frame configuring a framework of a seat cushion for an occupant of a vehicle to sit on. The seat cushion frame includes left and right side frames disposed at left and right side portions of the seat cushion, and a cushion pan that connects upper end portions of front portions of the left and right side frames together in a seat left-right direction, and that is weakened locally at a weakened portion provided at a seat left-right direction center of a rear end portion of the cushion pan.

The first aspect is a seat cushion frame configuring the framework of the seat cushion for the vehicle occupant to sit on, and includes the left and right side frames and the cushion pan. The left and right side frames are disposed at the left and right side portions of the seat cushion. The cushion pan is connected to the upper end portions of the front portions of the left and right side frames in the seat left-right direction. The cushion pan has been weakened locally by the weakened portion provided at the seat left-right direction center of the rear end portion.

The load imparted from the cushion pan to the buttocks of the occupant is low at the initial stage of the head-on collision, and so the submarining phenomenon can be suppressed from occurring by the reaction force from the cushion pan imparted to the buttocks of the occupant. In the latter half of the head-on collision, the cushion pan is deformed (fold-bended) about the weakened portion as a deformation origin by the increase in the load from the buttocks of the occupant imparted to the cushion pan. This enables a shock absorbing ability to be secured. Moreover, due to not being a configuration in which the pelvic region (buttock region) of the occupant that has surpassed the stopper of the seat cushion frame is stopped by the tiltable portion, as in the automobile seat described in the above "BACKGROUND" section, the forward movement of the occupant's pelvic region can be suppressed.

A seat cushion frame of a second aspect of the present disclosure is the first aspect, wherein the weakened portion is configured by a hole or a notch piercing the rear end portion of the cushion pan.

In the second aspect, a cushion pan provided with a weakened portion can be easily manufactured by, for example, merely forming a hole or a notch as described above in the rear end portion of an existing cushion pan.

The seat cushion frame of a third aspect of the present disclosure is the first aspect, wherein the left and right side frames are connected to a floor section of the vehicle via left and right links having respective one end portions connected to the front portions of the left and right side frames, via left and right risers to which respective other end portions of the left and right links are connected, and via left and right slide rails to which the left and right risers are attached, and a connection member connecting the left and right links together in the seat left-right direction is disposed separated by a gap from and below a rear portion of the cushion pan.

In the third aspect, the respective one end portions of the left and right links are connected to the front portions of the left and right side frames of the seat cushion frame. The respective other end portions of the left and right links are connected to the left and right risers, and the left and right risers are attached to the left and right slide rails. The left and right side frames are connected to the floor section of the vehicle via the left and right links, the left and right risers, and the left and right slide rails. The left and right links are connected together in the seat left-right direction by the connection member, and the connection member is disposed separated by a gap and below the rear portion of the cushion pan. This means that a space for the cushion pan to deform with a deformation origin of the weakened portion can still be secured even in a configuration in which the connection member is disposed below the rear portion of the cushion pan.

A vehicle seat frame of a fourth aspect of the present disclosure includes the seat cushion frame of the first aspect, left and right slide rails that are disposed below the left and right side frames included in the seat cushion frame, and that are attached to a floor section of the vehicle, left and right risers attached to the left and right slide rails, and left and right links having respective one end portions connected to the front portions of the left and right side frames and having respective other end portions connected to the left and right risers.

In the fourth aspect the seat cushion frame includes the left and right side frames. The one end portions of the left and right links are connected to the front portions of the left and right side frames. The left and right slide rails are disposed below the left and right side frames and are attached to the floor section of the vehicle. The left and right risers connected to the respective other end portions of the left and right links are attached to the left and right slide rails. The seat cushion frame referred to above is the seat cushion frame of the first aspect. This means that similar advantageous effects to those of the first aspect are obtained.

A vehicle seat of a fifth aspect of the present disclosure includes a seat cushion for an occupant to sit on, a seatback configuring a backrest to support a back of the occupant, and framework of the seat cushion comprising the seat cushion frame of the first aspect.

In the fifth aspect, the vehicle seat includes the seat cushion and the seatback, and the framework of the seat cushion comprising the seat cushion frame of the first aspect. This means that similar advantageous effects are obtained to those of the first aspect.

As described above, the seat cushion frame, vehicle seat frame, and vehicle seat according to the present disclosure are able to secure a shock absorbing ability while also suppressing a submarining phenomenon from occurring during a head-on collision.

BRIEF DESCRIPTION OF THE DRAWINGS

Exemplary embodiments of the present disclosure will be described in detail based on the following figures, wherein.

DETAILED DESCRIPTION

Figure 1:
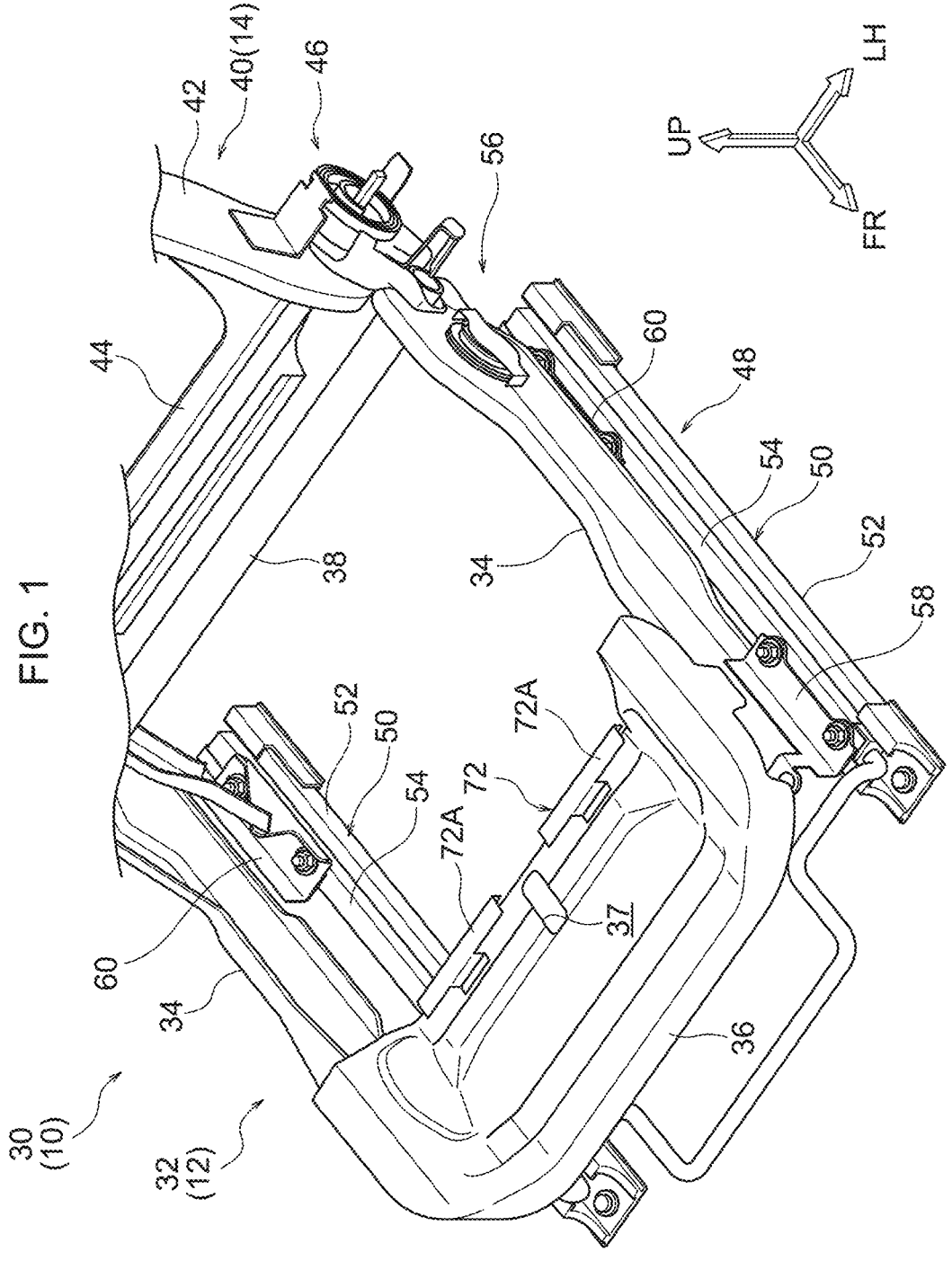
FIG. 1 is a perspective view illustrating a periphery of a seat cushion frame in a vehicle seat frame according to an exemplary embodiment, in a state viewed diagonal from a seat left-front side and above.

A vehicle seat 10, a vehicle seat frame 30, and a seat cushion frame 32 according to an exemplary embodiment of the present disclosure will now be described, with reference to FIG. 1 to FIG. 8C. Note that some of the reference numerals are omitted in the drawings to make viewing the drawings clearer. Moreover as appropriate in the drawings, an arrow FR indicates a vehicle front direction, an arrow UP indicates a vehicle upward direction, an arrow LH indicates a vehicle left direction, and an arrow RH indicates a vehicle right direction. When front-rear, left-right, and up-down directions are used in the following explanation, unless particularly stated otherwise, these refer to front-rear in the vehicle front-rear direction, left-right in the vehicle left-right direction (vehicle width direction), and up-down in the vehicle up-down direction.

Figure 8A:
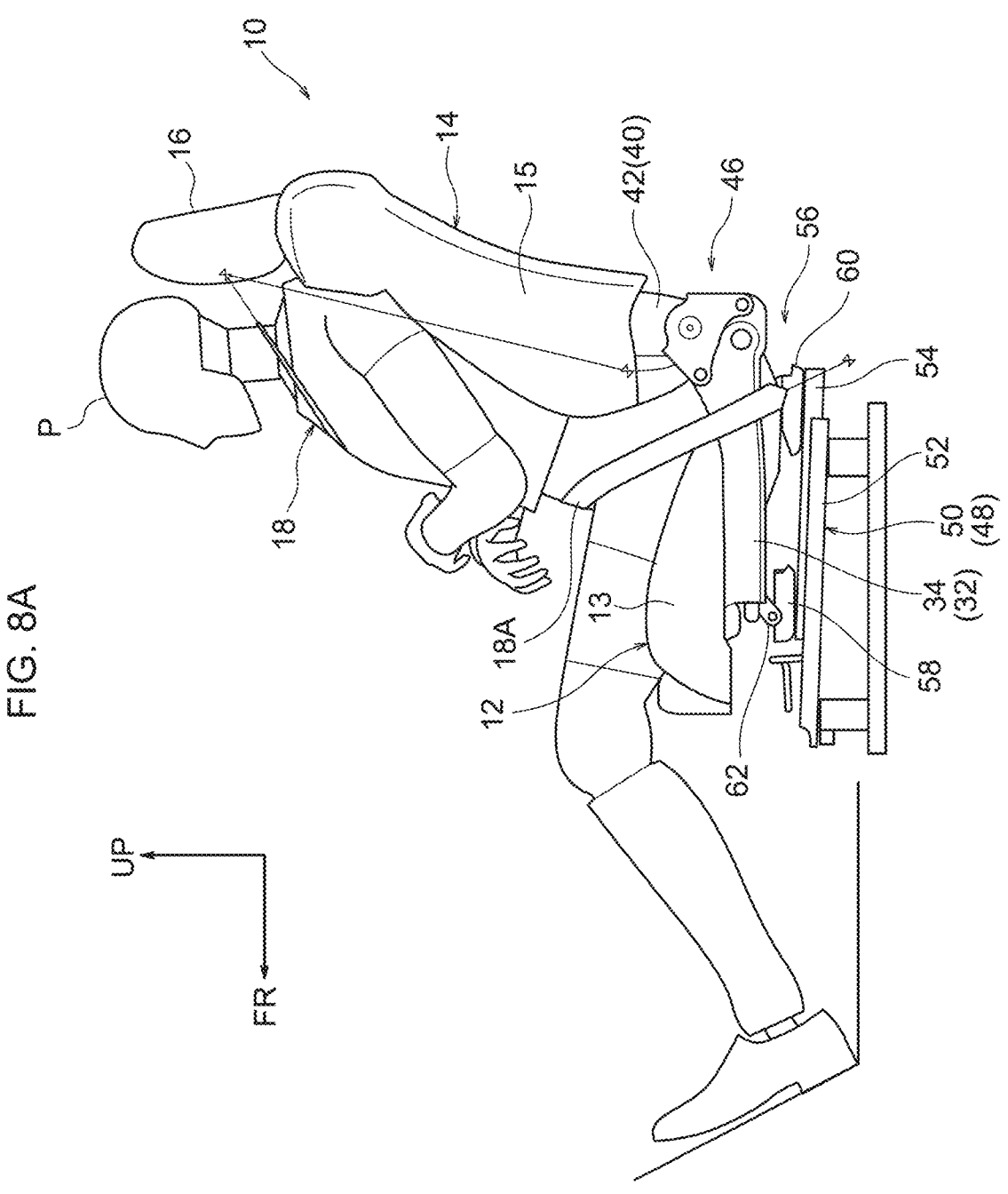
FIG. 8A is a side view illustrating a vehicle seat according to an exemplary embodiment, and is a side view illustrating a state prior to a head-on collision.
Figure 8B:
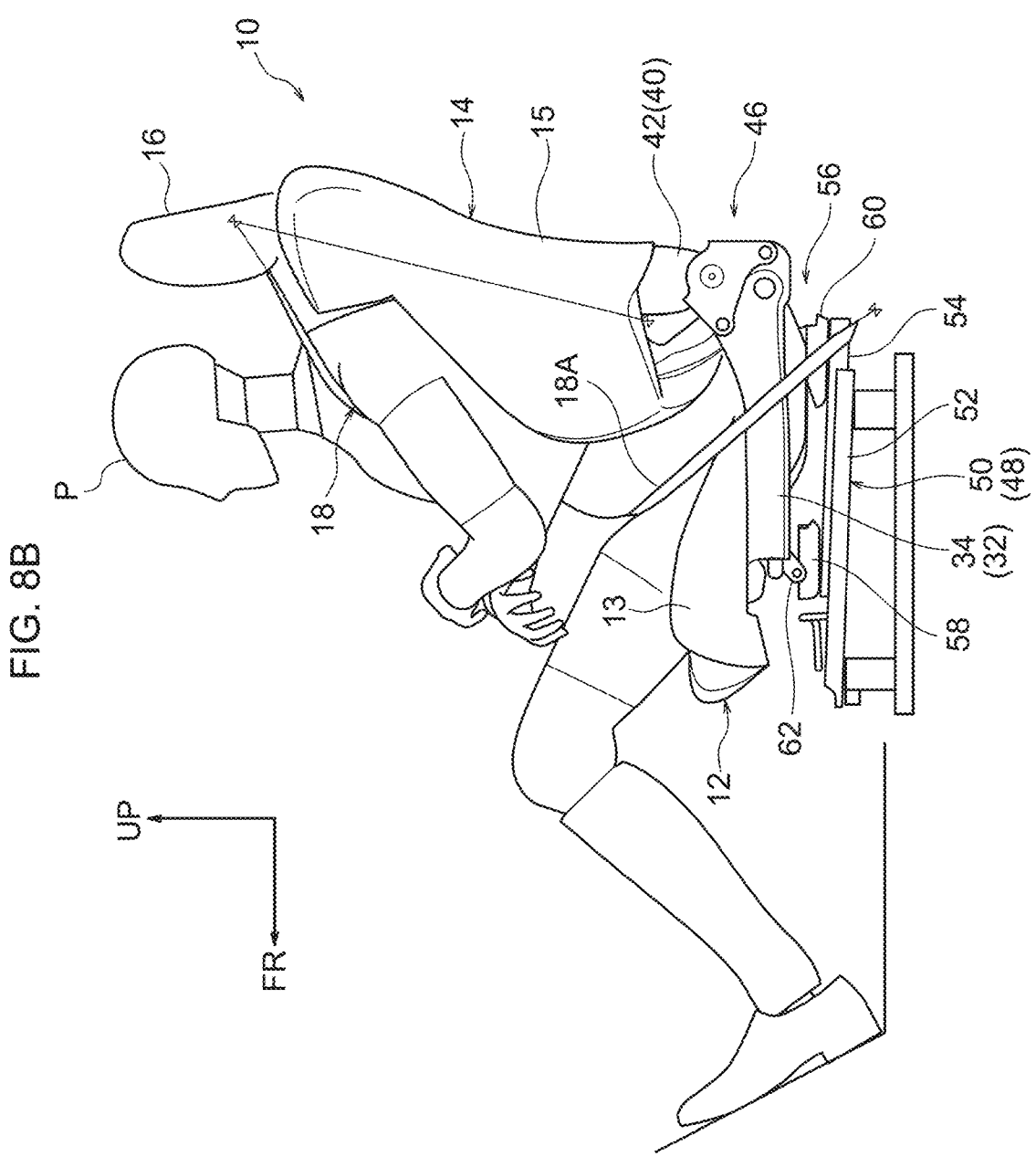
FIG. 8B is a side view corresponding to FIG. 8A and illustrating a state at an initial stage in a head-on collision.
Figure 8C:
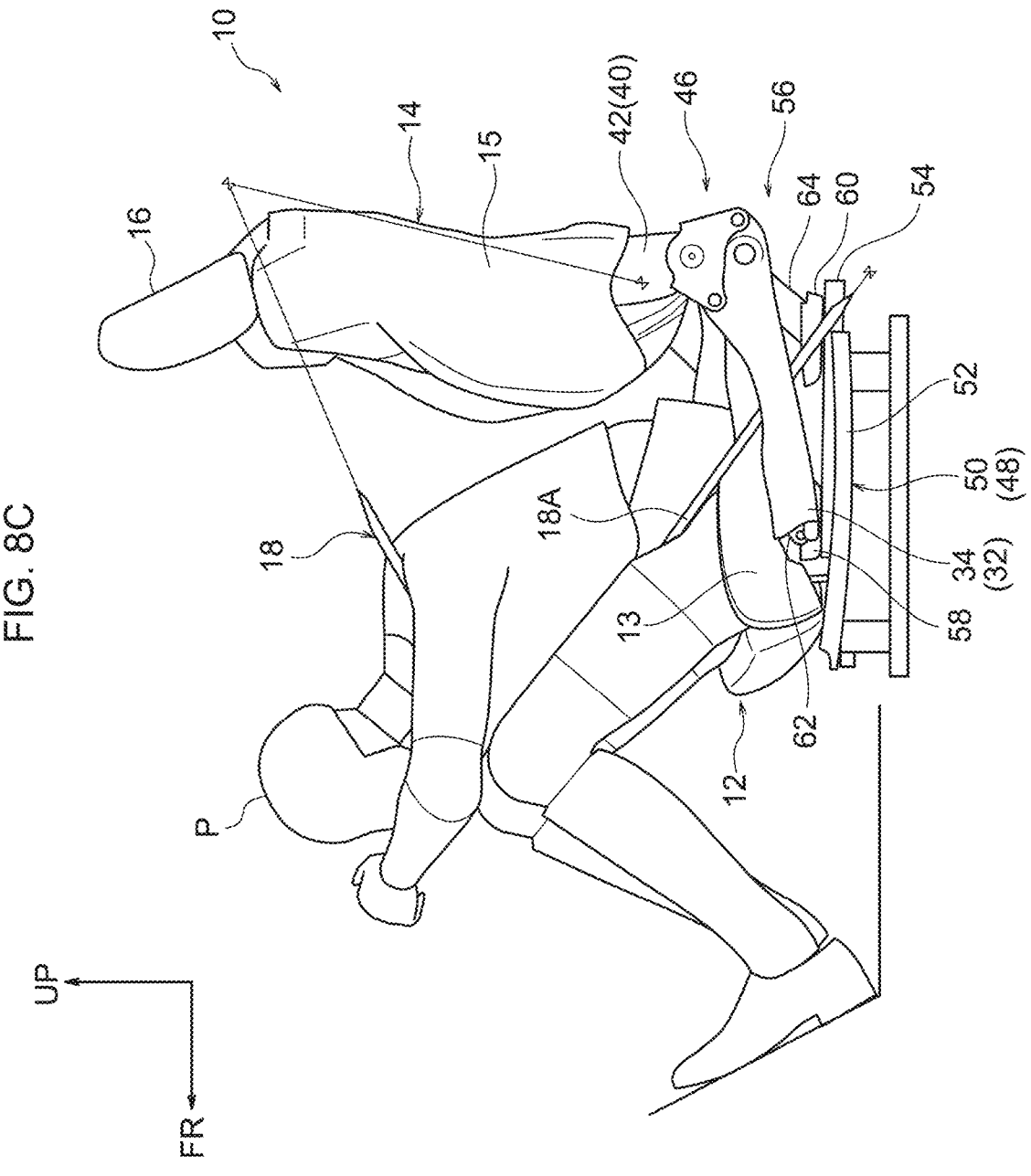
FIG. 8C is a side view corresponding to FIG. 8A and FIG. 8B and illustrating a state at later stage of a head-on collision.

As illustrated in FIG. 8A to FIG. 8C, the vehicle seat 10 according to the present exemplary embodiment includes a seat cushion 12 for an occupant P of a vehicle to sit on, a seatback 14 configuring a backrest to support the back of the occupant P, and a headrest 16 for supporting the head of the occupant P. The front-rear direction, left-right direction (width direction), and up-down direction of the vehicle seat 10 are respectively aligned with the front-rear, left-right, and up-down directions of the vehicle. Note that the occupant P illustrated in FIG. 8A to FIG. 8C is, for example, a fifty percentile America male adult (AM50) HYBRID III dummy for use in head-on collision crash tests. The occupant P wears a three-point seatbelt 18 installed to a non-illustrated vehicle.

The framework of the vehicle seat 10 is configured by a vehicle seat frame 30 as illustrated in FIG. 1 to FIG. 4. The vehicle seat frame 30 includes the seat cushion frame 32 configuring framework of the seat cushion 12, and a seatback frame 40 configuring framework of the seatback 14. Pad members (omitted in the drawings) respectively covered by a cover 13, 15 (see FIG. 8A to FIG. 8C) are attached to the seat cushion frame 32 and the seatback frame 40.

The seat cushion frame 32 includes a left-right pair of side frames 34 disposed at left and right side portions of the seat cushion 12 and extending along the seat front-rear direction, a cushion pan 36 spanning between upper end portions at the front portions of the left and right side frames 34, and a rear frame 38 spanning between rear end portions of the left and right side frames 34. Non-illustrated seat cushion springs are spanned between the cushion pan 36 and the rear frame 38. The pad member of the seat cushion 12 is elastically supported from the seat lower side by these seat cushion springs.

The left and right side frames 34 are, for example, formed in elongated shapes from press formed sheet metal, and are disposed at an orientation such that their length directions are along the seat front-rear direction, and their thickness directions are along the seat left-right direction. The cushion pan 36 is, for example, formed in a substantially rectangular shape from sheet metal, and is disposed at an orientation such that its thickness direction is along the seat up-down direction, and the seat left-right direction two end portions of the cushion pan 36 are fixed to the respective front portions of the left and right side frames 34 by a method such as welding. The rear frame 38 is, for example, formed from a metal pipe, and is disposed at an orientation such that its axial direction is along the seat left-right direction, with both seat left-right direction ends of the rear frame 38 connected, so as to allow rotation, to rear end portions of the left and right side frames 34 by a method such as crimping.

A lower end portion of the seatback frame 40 is connected to rear end portions of the left and right side frames 34 through a known reclining mechanism 46 so as to enable reclining. The seatback frame 40 includes a left-right pair of side frames 42 disposed at left and right side portions of the seatback 14 and extending in the seat up-down direction, a non-illustrated upper frame spanning between upper end portions of the left and right side frames 42, and a lower frame 44 spanning between lower end portions of the left and right side frames 42. The headrest 16 is connected to the above upper frame.

The left and right side frames 34 of the seat cushion frame 32 are connected to a vehicle floor section through a known slider mechanism 48 and lifter mechanism 56, and are accordingly adjustable in both front-rear direction position and up-down direction position with respect to the vehicle floor section. The slider mechanism 48 is configured including a left-right pair of slide rails 50 disposed below the left and right side frames 34. The slide rails 50 each include a lower rail 52 fixed to the vehicle floor section by, for example, a method such bolt fastening, an upper rail 54 supported by the lower rail 52 so as to be able to slide in the front-rear direction relative thereto, and a non-illustrated lock mechanism to restrict sliding of the upper rail 54 with respect to the lower rail 52. The lower rail 52 and the upper rail 54 are disposed with their long sides along the front-rear direction.

Figure 2:
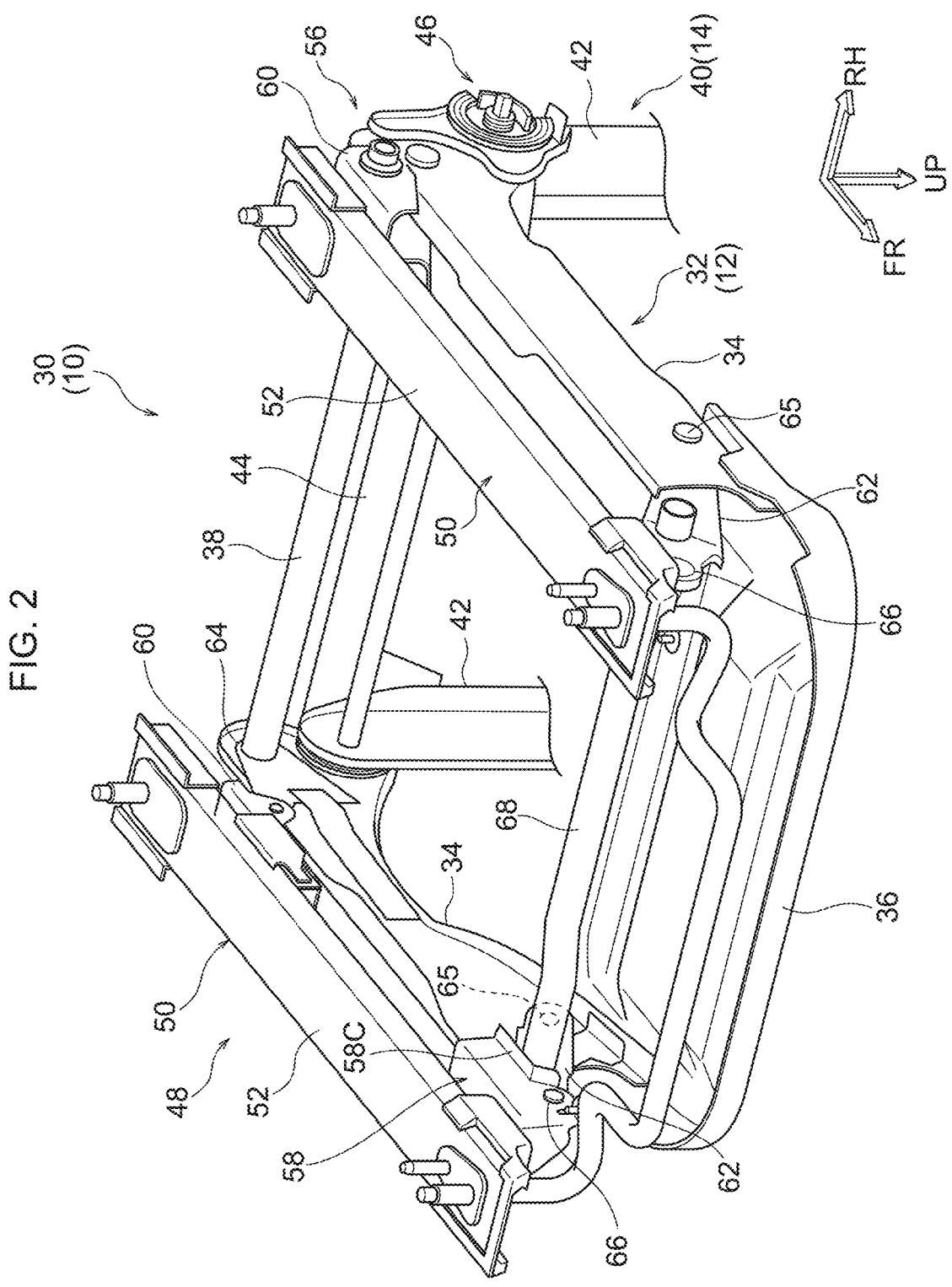
FIG. 2 is a perspective view illustrating a periphery of a seat cushion frame of the same vehicle seat frame, in a state viewed diagonal from a seat right-front side and below.

The lifter mechanism 56 is configured including a left-right pair of front risers 58 (see FIG. 1 to FIG. 4), a left-right pair of rear risers 60 (see FIG. 1 and FIG. 2), a left-right pair of front links 62 (see FIG. 2 to FIG. 3), and a left-right pair of rear links 64 (see FIG. 2; note that the right side rear link 64 is omitted in the drawing). The left and right front risers 58, the left and right rear risers 60, the left and right front links 62, and the left and right rear links 64 are, for example, manufactured from press formed sheet metal. The left and right front risers 58 correspond to "left and right risers" of the present disclosure, and the left and right front links 62 correspond to "left and right links" of the present disclosure.

Figure 3:
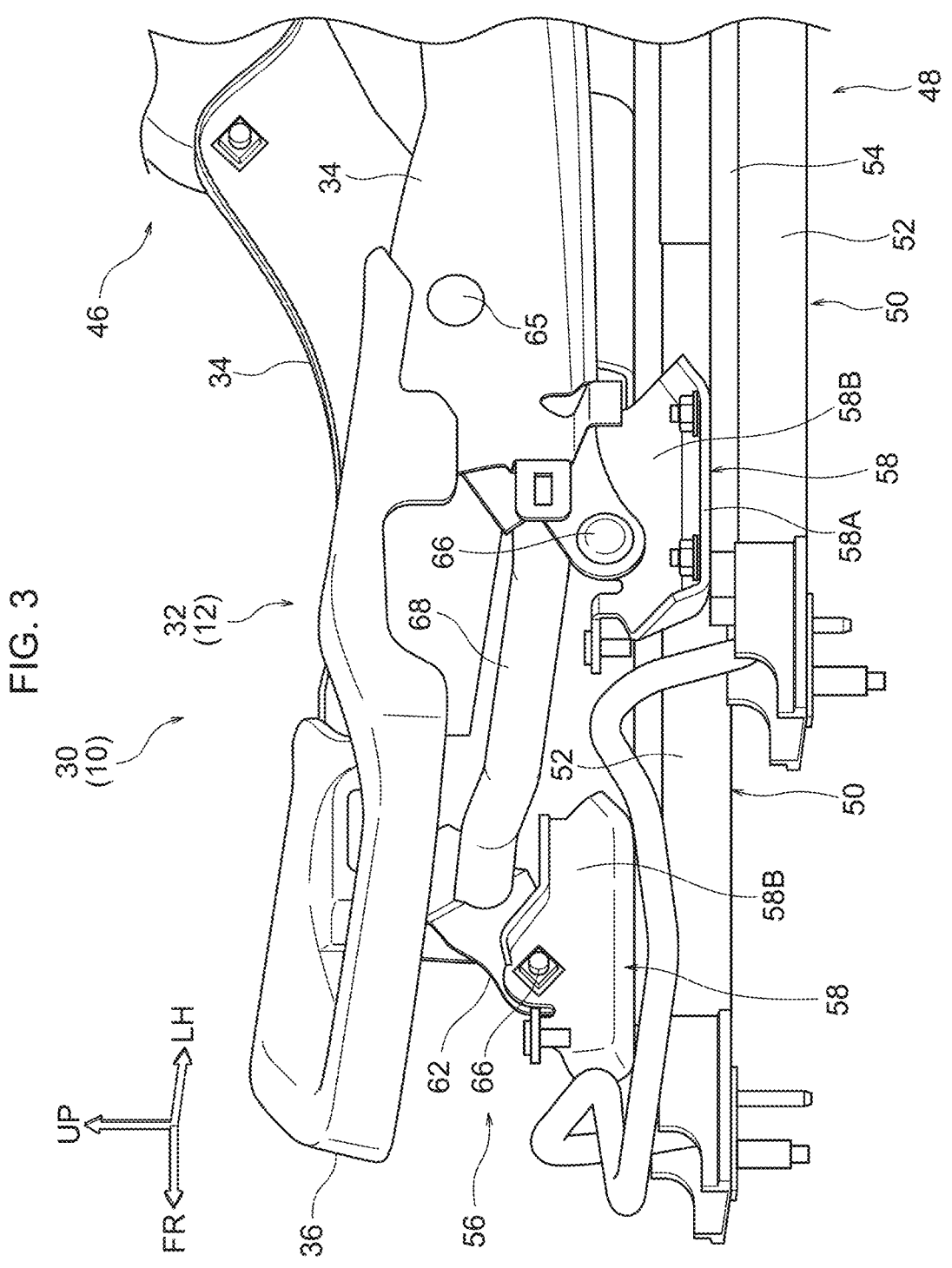
FIG. 3 is a perspective view illustrating a periphery of a front portion of a seat cushion frame of the same vehicle seat frame, in a state viewed diagonal from a seat left-front side.

As illustrated in FIG. 3, the left and right front risers 58 each include a front fixed portion 58A fixed to an upper face of front end portions of the left and right upper rails 54 by a method such as bolt fastening, and a front vertical wall 58B extending upward from left-right direction inside end portions of the front fixed portion 58A. Although omitted from the drawings, the left and right rear risers 60 include rear fixed portions fixed to an upper face of rear end portions of the left and right upper rails 54 by a method such as bolt fastening and rear vertical walls extending upward from left-right direction one end portions of the rear fixed portions.

The left and right front links 62 and the left and right rear links 64 are disposed at orientations tilting toward the rear side. Each of one end portions (each upper end portion) of the left and right front links 62 is superimposed on a front portion of the left and right side frames 34 from the left-right direction inside, and is connected to the front portion of the left and right side frames 34 so as to be capable of rotating with respect thereto through a connection shaft 65 having an axial direction along the left-right direction. Each other end portion (each lower end portion) of the left and right front links 62 is superimposed on a front vertical wall 58B of the left and right front risers 58 from the left-right direction outside, and connected to the front vertical wall 58B so as to be capable of rotating with respect thereto through a connection shaft 66 having an axial direction along the left-right direction.

Each one end portion (each upper end portion) of the left and right rear links 64 is disposed at the left-right direction inside with respect to the rear portion of the left and right side frames 34, and is fixed to the rear frame 38. The left and right rear links 64 are accordingly connected to the left and right side frames 34 so as to be capable of rotating with respect thereto through the rear frame 38. Each other end portion (each lower end portion) of the left and right rear links 64 is superimposed on a rear vertical wall of the left and right rear risers 60 from one left-right direction side, and connected to the rear vertical wall so as to be capable of rotating with respect thereto through a connection shaft (omitted in the drawings) having an axial direction along the left-right direction.

A sector gear is, for example, formed to one of the left and right rear links 64, and this rear link 64 is rotated by a non-illustrated pinion meshed with this sector gear being rotated manually or electrically. A configuration is accordingly achieved in which the left and right rear links 64 and the left and right front links 62 are rotated thereby, and the up-down direction position of the seat cushion frame 32 (namely, the seat cushion 12) is changed.

The left and right front links 62 are connected together in the left-right direction by a connection pipe 68 serving as a connection member. The connection pipe 68 is configured from, for example, a metal pipe member, and is disposed with its axial direction along the left-right direction. The two axial direction end portions of the connection pipe 68 are inserted into through holes (omitted in the drawings) formed through intermediate portions of the left and right front links 62, and are fixed to the left and right front links 62 by a method such as welding.

Figure 4:
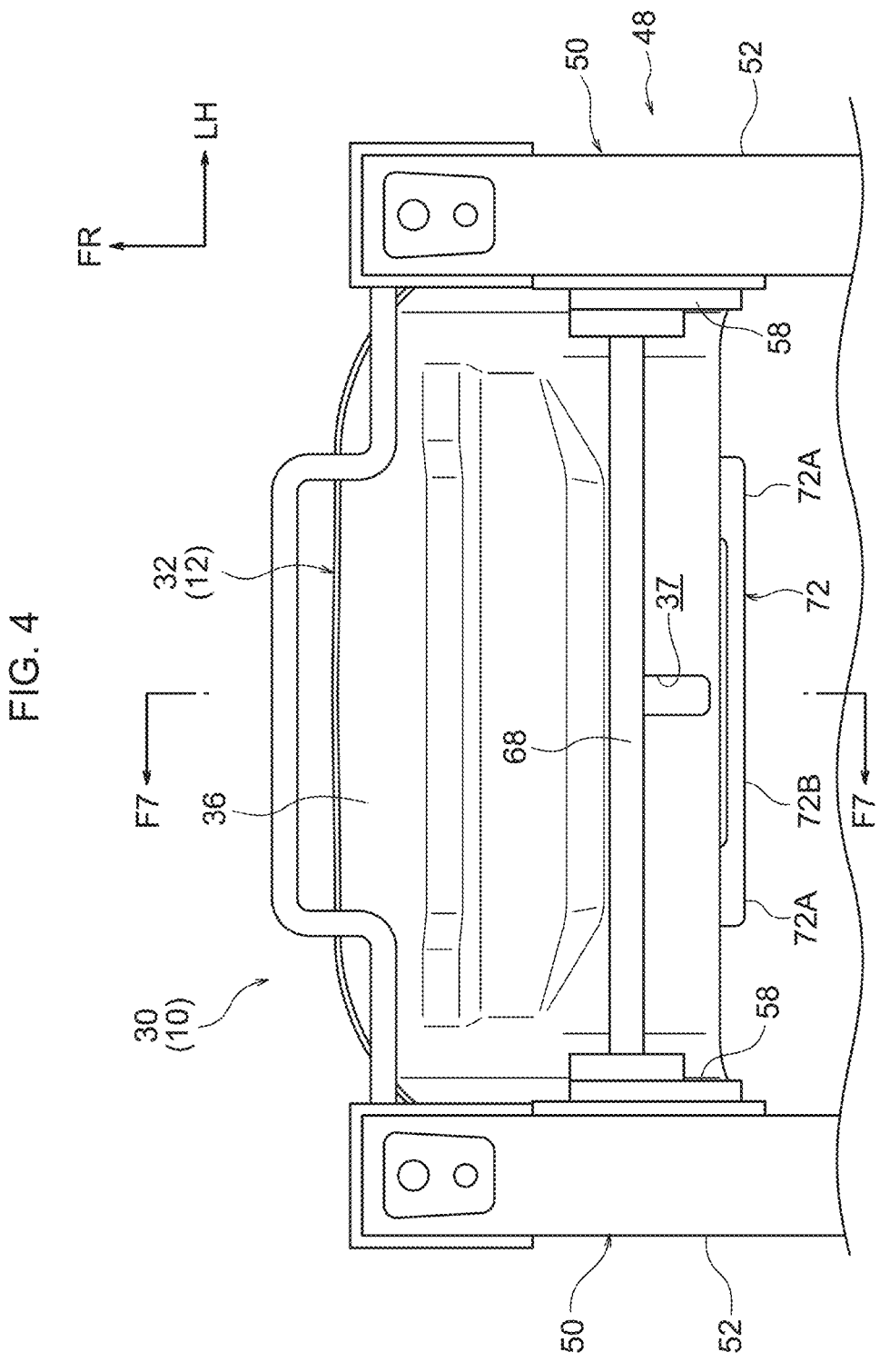
FIG. 4 is a bottom view illustrating a periphery of a front portion of a seat cushion frame of the same vehicle seat frame, in a state viewed from a seat lower side.

As illustrated in FIG. 1 and FIG. 4, the seat cushion frame 32 includes a reinforcement member 72 fixed to a rear end portion of the cushion pan 36. The reinforcement member 72 is, for example, manufactured from press formed sheet metal, and includes a left-right pair of reinforcement portions 72A and a connection portion 72B. The left and right reinforcement portions 72A are fixed to the two left-right direction sides of rear end portions of the cushion pan 36, and reinforce the affixed locations. The connection portion 72B connects the left and right reinforcement portions 72A together in the left-right direction.

Figure 5:
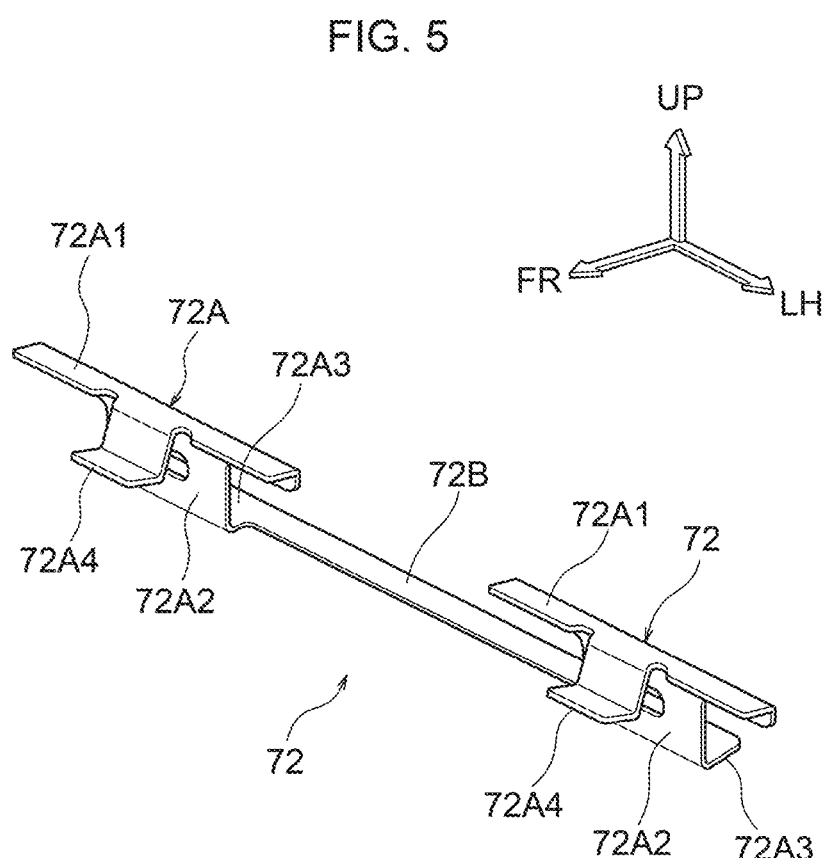
FIG. 5 is a perspective view illustrating a reinforcement member.

As illustrated in FIG. 5, the left and right reinforcement portions 72A each include, as an example, a fixed portion 72A1, a downward extension portion 72A2, a rearward extension portion 72A3, and a fixing tab 72A4. The fixed portions 72A1 are fixed to an upper face of rear end portions of the cushion pan 36 by a method such as welding. The downward extension portions 72A2 extend downward from left-right direction central portions of rear edges of the fixed portions 72A1. The rearward extension portions 72A3 extend rearward from lower ends of the downward extension portions 72A2. The rearward extension portions 72A3 of the left and right reinforcement portions 72A are connected together in the left-right direction by the connection portion 72B, and are formed as one body with the connection portion 72B. The fixing tabs 72A4 extend downward from left-right direction central portions of front edges of the fixed portions 72A1. A lower side of each of the fixing tabs 72A4 is bent forward. The fixing tabs 72A4 are inserted into non-illustrated holes formed in the cushion pan 36, and are fixed to the cushion pan 36 by a method such as welding.

As illustrated in FIG. 1 and FIG. 4, a single through hole 37 serving as a weakened portion is formed at a left-right direction center of a rear end portion of the cushion pan 36. The through hole 37 corresponds to a "hole" of the present disclosure. The through hole 37, as an example, is configured in a rectangular shape having a long side along the front-rear direction and piercing the rear end portion of the cushion pan 36. The rear end portion of the cushion pan 36 is weakened locally at the location where this through hole 37 is formed.

Figure 6:
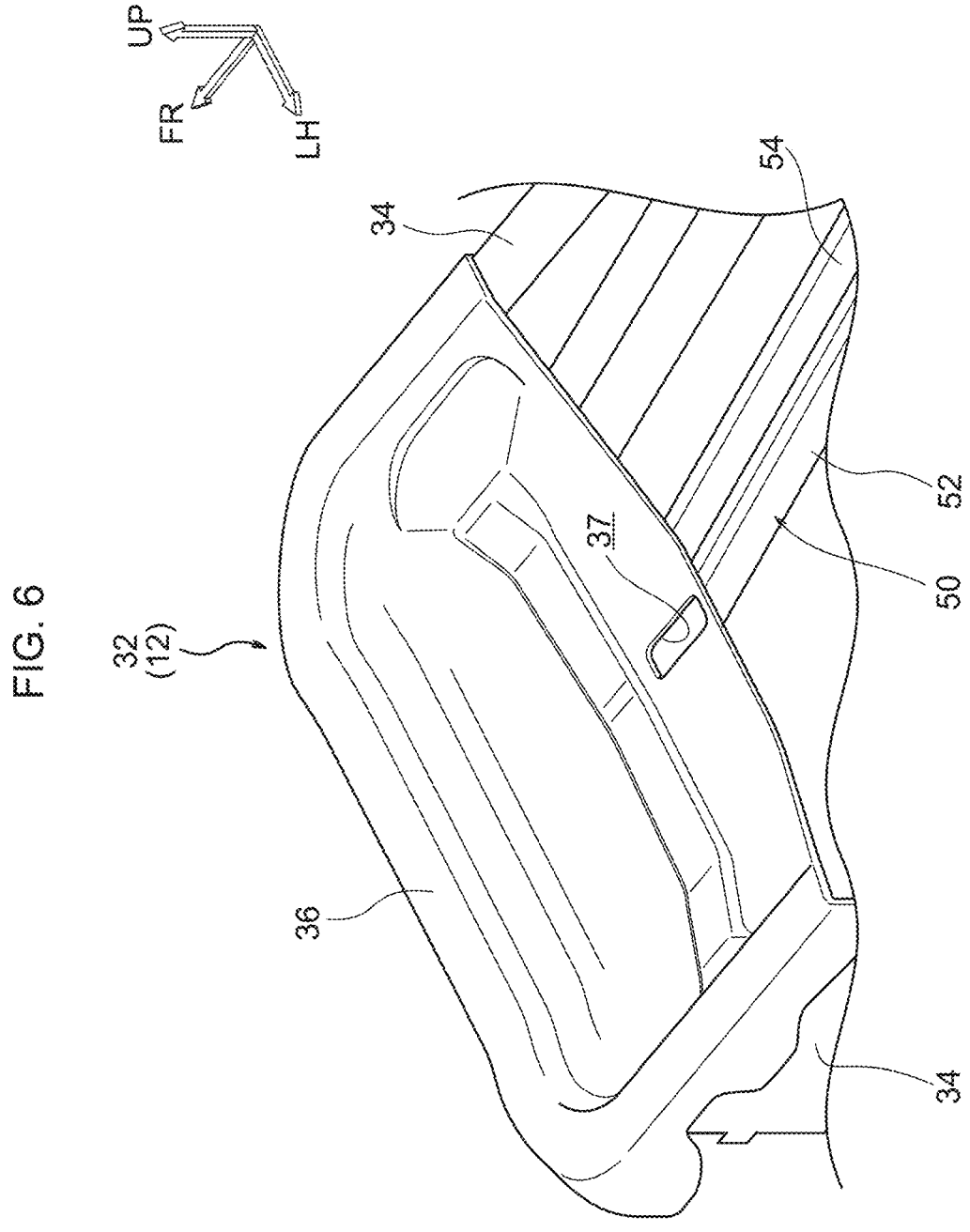
FIG. 6 is a perspective view illustrating a deformed state of a cushion pan, in a state viewed diagonal from a seat left-rear and above.

The above through hole 37 serves as an origin for deformation when the cushion pan 36 deforms during a head-on collision of a vehicle. The head-on collision referred to above is, for example, a collision similar to a full frontal rigid barrier impact test (at a speed of 35 mph (approximately 56 km/h)) as defined by the US National Highway Traffic Safety Administration (NHTSA). A comparatively low load from the occupant P is imparted to the seat cushion 12 at an initial stage of the head-on collision (see FIG. 8B), and a comparatively high load from the occupant P is imparted to the seat cushion 12 at a later stage of the head-on collision (see FIG. 8C). The strength of the cushion pan 36 is set such that the cushion pan 36 deforms downward about an deformation origin of the through hole 37 at the later stage of the head-on collision, as illustrated in FIG. 6.

Plural through holes 37 may be provided instead of a single through hole 37. Moreover, the weakened portion formed at the left-right direction center of the rear end portion of the cushion pan 36 is not limited to being the through hole 37, and any configuration may be adopted in which the left-right direction center of the rear end portion of the cushion pan 36 is weakened locally. For example, the weakened portion may be notched to pierce the left-right direction center of the rear end portion of the cushion pan 36, or may be a bent portion where the left-right direction center of the rear end portion of the cushion pan 36 has been bent locally.

Figure 7:
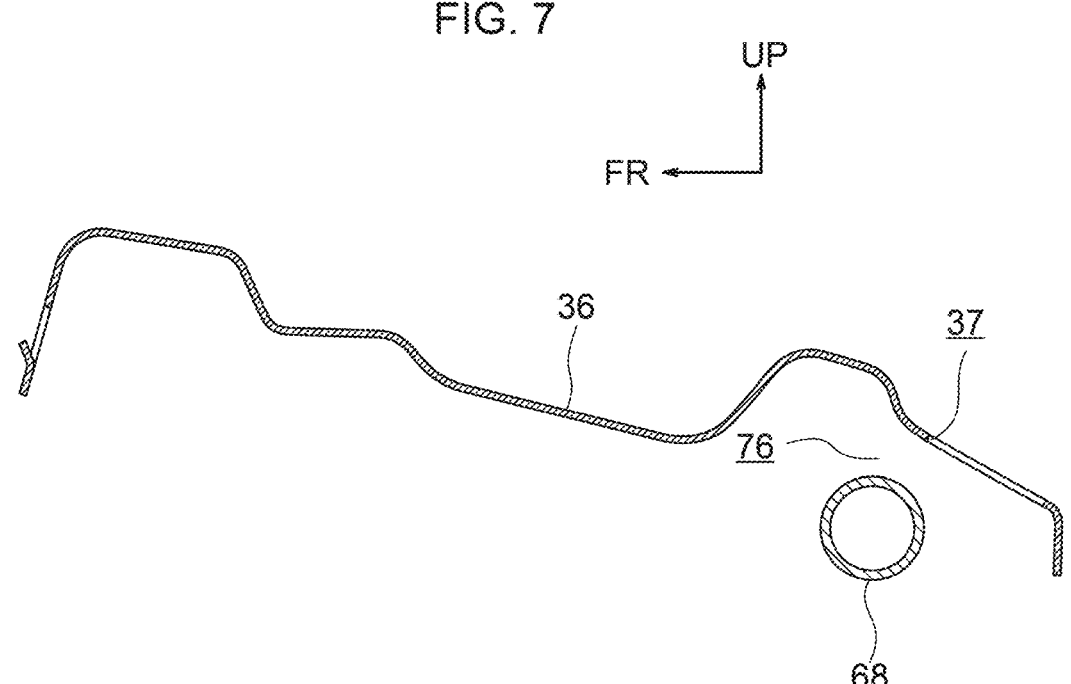
FIG. 7 is a cross-section corresponding to a section taken along line F7-F7 of FIG. 4.

Moreover, in the present exemplary embodiment as illustrated in FIG. 4, a connection pipe 68 of the lifter mechanism 56 is disposed below the rear portion of the cushion pan 36. This connection pipe 68 is, as illustrated in FIG. 7, disposed separated from the rear portion of the cushion pan 36 by a gap (clearance) 76. The size of the gap 76 may, for example, be enlarged by making the diameter of the connection pipe 68 smaller. A configuration is accordingly adopted in which there is no other member interposed between the connection pipe 68 and the rear portion of the cushion pan 36. Note that the reinforcement member 72 is omitted from illustration in FIG. 6 and FIG. 7.

As stated above, the connection pipe 68 rotates together with the front links 62 accompanying change (adjustment) of the up-down position of the seat cushion 12 by the lifter mechanism 56, however, a configuration is adopted such that the gap 76 is secured irrespective of the rotational position of the connection pipe 68. This accordingly results in a configuration such that a deformation stroke is secured when the cushion pan 36 deforms downward about a deformation origin of the through hole 37.

Moreover, the configuration in the present exemplary embodiment is such that the amount of deformation of the cushion pan 36 during a head-on collision is adjusted by the reinforcement member 72 configured as described above (deformation amount adjustment member). The left and right reinforcement portions 72A of the reinforcement member 72 are disposed at positions so as to oppose the left and right ischial bones of the occupant P (omitted in the drawings) from the front side. Thus during a head-on collision the load from the left and right ischial bones of the occupant P is input to the locations affixed with the left and right reinforcement portions 72A on the cushion pan 36. At an initial stage of a head-on collision (see FIG. 8B) deformation (collapsing inward toward the lower side) of the cushion pan 36 is suppressed by the left and right reinforcement portions 72A. Then, at a later stage of the head-on collision, the cushion pan 36 is deformed about a deformation origin of the through hole 37 by an increase in the load imparted to the cushion pan 36 from the left and right ischial bones of the occupant P. Note that the cushion pan 36 may be configured without the above reinforcement member 72.

Operation and Advantageous Effects

Next, description follows regarding operation and advantageous effects of the present exemplary embodiment.

In the vehicle seat 10 configured as described above, the seat cushion frame 32 configuring the framework of the seat cushion 12 includes the left and right side frames 34 disposed at the left and right side portions of the seat cushion 12, and the cushion pan 36 connected along the left-right direction to upper end portions of the front portions of the left and right side frames 34. The cushion pan 36 is weakened locally at the through hole 37 serving as the weakened portion provided at the left-right direction center of the rear end portion of the cushion pan 36.

The load from the buttocks of the occupant P imparted to the cushion pan 36 is low at an initial stage of a head-on collision (see FIG. 8B), and so a submarining phenomenon can be suppressed from occurring by the reaction force imparted from the cushion pan 36 to the buttocks of the occupant. At a latter half of a head-on collision (see FIG. 8C), the cushion pan 36 is deformed (fold-bended downward) about a deformation origin of the through hole 37 by the increase in the load from the buttocks of the occupant P imparted to the cushion pan 36. This enables a shock absorbing ability to be secured. Moreover, due to being a configuration such that of the automobile seat described in the "BACKGROUND" section above, in which the pelvic region (buttock region) of an occupant that has surpassed a stopper of the seat cushion frame is stopped by a tiltable portion, forward movement of the pelvic region of the occupant can be suppressed.

Moreover, in the present exemplary embodiment, the through hole 37 serves as the weakened portion and so a cushion pan 36 formed with the weakened portion can be manufactured easily by, for example, merely forming the through hole 37 at the left-right direction center of the rear end portion of an existing cushion pan. Moreover, the through hole 37 (weakened portion) is configured with a rectangular shape having a long side along the front-rear direction, and so functions well as an origin of a fold-bending portion when the rear end portion of the cushion pan

36 is fold-bended into a substantially V-shape when viewed along the front-rear direction.

Moreover, in the present exemplary embodiment, the connection pipe 68 of the lifter mechanism 56 is disposed below the rear portion of the cushion pan 36, and the connection pipe 68 is disposed separated from the rear portion of the cushion pan 36 by the gap 76. This means that even in a configuration in which the connection pipe 68 is disposed below the rear portion of the cushion pan 36, a space can still be secured for the cushion pan 36 to deform about the deformation origin of the through hole 37 (weakened portion). Moreover, the amount of shock absorption can be adjusted by adjusting the size of the gap 76 serving as this deformation space. Furthermore, when the cushion pan 36 deformed in such a manner impacts the connection pipe 68, further deformation of the cushion pan 36 is suppressed, enabling the forward movement of the pelvic region of the occupant P to be restricted. The shock is moreover absorbed in the space above the connection pipe 68, enabling application to a vehicle for which it is difficult to secure a shock absorption space below the connection pipe 68.

Moreover, the present exemplary embodiment includes the reinforcement member 72 fixed to the rear end portion of cushion pan 36 of the seat cushion frame 32. The reinforcement member 72 includes the left and right reinforcement portions 72A fixed to two seat left-right direction sides of the rear end portion of the cushion pan 36, and the locations affixed with the left and right reinforcement portions 72A on the cushion pan 36 are reinforced thereby. Deformation of the cushion pan 36 by load imparted from the buttocks of the occupant P to the cushion pan 36 is accordingly suppressed at an initial stage of the head-on collision (see FIG. 8B). The reaction force from the cushion pan 36 imparted to the occupant P is accordingly increased at the initial stage of the head-on collision, raising the occupant P forward movement suppressing effect, and raising the submarining phenomenon occurrence suppressing effect. Moreover, the load imparted from the occupant P to the front portion of the seat cushion frame 32 increases at a later stage of the head-on collision (see FIG. 8C). The cushion pan 36 is accordingly deformed from the left-right direction center, which is not reinforced by the left and right reinforcement portions 72A. This enables the shock absorbing ability raising effect to be secured.

Moreover, in the present exemplary embodiment the left and right reinforcement portions 72A of the reinforcement member 72 are connected in the left-right direction by the connection portion 72B, enabling the reinforcement member 72 to be configured as a single component. As a result this facilitates a reduction in manufacturing cost compared to cases in which the reinforcement member 72 is two components. Moreover, due to reaction force from the connection portion 72B also being imparted to the buttocks of the occupant P at an initial stage of the head-on collision, the submarining phenomenon occurrence suppressing effect can be raised even more.

Note that although in the above exemplary embodiment the reinforcement member 72 fixed to the rear end portion of the cushion pan 36 is configured including the connection portion 72B connecting the left and right reinforcement portions 72A together, there is no limitation thereto, and the reinforcement member 72 may be configured without including the connection portion 72B.

Moreover, although in the above exemplary embodiment the connection pipe 68 serving as the connection member is configured manufacture from a metal pipe, there is no limitation thereto, and the material of the connection member may be modified as appropriate.

Various other modifications may also be implemented in the present disclosure within a range not departing from the spirit of the present disclosure. Obviously the scope of rights of the present disclosure is not limited by the above exemplary embodiments.

What is claimed is:

1. A seat cushion frame configuring a framework of a seat cushion for an occupant of a vehicle to sit on, the seat cushion frame comprising:

left and right side frames disposed at left and right side portions of the seat cushion; and a cushion pan that connects upper end portions of front portions of the left and right side frames together in a seat left-right direction, and that is weakened locally at a weakened portion provided at a seat left-right direction center of a rear end portion of the cushion pan;

left and right links having respective one end portions connected to front portions of the left and right side frames; and a connection member configured to connect the left and right links together in the seat left-right direction, which is disposed below a rear portion of the cushion pan and separated by a gap from the rear portion of the cushion pan, wherein the weakened portion is not provided on both sides of the cushion pan in the seat left-right direction, wherein, when the cushion pan deforms from the weakened portion owing to a load from buttocks of the occupant during a head-on collision, the cushion pan is configured to impact the connection member, and the connection member is configured to suppress a deformation of the cushion pan, wherein, during the head-on collision, the cushion pan is fold-bended into a substantial V-shape as viewed along a front-rear direction of the vehicle, starting from the weakened portion, as a result of the load from the buttocks of the occupant.

2. The seat cushion frame of claim 1, wherein the weakened portion is configured by a hole or a notch piercing the rear end portion of the cushion pan.

3. The seat cushion frame of claim 1, wherein:

the left and right side frames are connected to a floor section of the vehicle via the left and right links, via left and right risers to which respective other end portions of the left and right links are connected, and via left and right slide rails to which the left and right risers are attached.

4. The seat cushion frame of claim 3, wherein the rear portion of the cushion pan includes a portion that extends downward, and the connection member is disposed on the seat front side separated by the gap from the extended portion.

5. The seat cushion frame of claim 3, wherein there is no other member interposed between the connection member and the rear portion of the cushion pan.

6. A vehicle seat frame comprising:

the seat cushion frame of claim 1;

left and right slide rails that are disposed below the left and right side frames included in the seat cushion frame, and that are attached to a floor section of the vehicle;

left and right risers attached to the left and right slide rails; and left and right links having respective one end portions connected to the front portions of the left and right side frames and having respective other end portions connected to the left and right risers.

7. A vehicle seat comprising:

a seat cushion for an occupant to sit on;

a seatback configuring a backrest to support a back of the occupant; and a framework of the seat cushion comprising the seat cushion frame of claim 1.

\* \* \* \* \*